(12) United States Patent
Mesinger

(10) Patent No.: US 10,557,454 B2
(45) Date of Patent: Feb. 11, 2020

(54) STORED ENERGY SYSTEM

(71) Applicant: Jeshoa Mesinger, Caesarea (IL)

(72) Inventor: Jeshoa Mesinger, Caesarea (IL)

( * ) Notice: Subject to any disclaimer, the term of this patent is extended or adjusted under 35 U.S.C. 154(b) by 25 days.

(21) Appl. No.: 15/318,060

(22) PCT Filed: May 10, 2015

(86) PCT No.: PCT/IL2015/050485
§ 371 (c)(1),
(2) Date: Dec. 12, 2016

(87) PCT Pub. No.: WO2015/193873
PCT Pub. Date: Dec. 23, 2015

(65) Prior Publication Data
US 2017/0122284 A1    May 4, 2017

Related U.S. Application Data

(60) Provisional application No. 62/012,450, filed on Jun. 16, 2014.

(51) Int. Cl.
*F03B 13/06* (2006.01)
*F03B 15/00* (2006.01)
(Continued)

(52) U.S. Cl.
CPC ............ *F03B 17/025* (2013.01); *F03B 13/06* (2013.01); *F03B 15/00* (2013.01); *F03B 17/02* (2013.01);
(Continued)

(58) Field of Classification Search
CPC .......... F03B 17/02; F03B 13/06; F03B 15/00; F05B 2260/4031; F05B 2260/42; F05B 2260/20
(Continued)

(56) References Cited

U.S. PATENT DOCUMENTS 3,961,479 A * 6/1976 Anderson ............. F03B 17/025
                                                        60/496
4,267,695 A    5/1981 Micciche
(Continued)

OTHER PUBLICATIONS

International Search Report regarding PCT/IL2015/050485, 6 pages, dated Mar. 14, 2016.
(Continued)

*Primary Examiner* — Mark A Laurenzi
*Assistant Examiner* — Mickey H France

(57) ABSTRACT

A hydrostatically based energy conversion unit, which comprises a vertically oriented cylinder; a piston sealingly engaged with and vertically displaceable within the cylinder; a horizontal shaft rotatably mounted to a surface located above the cylinder and mechanically connected to the piston; a motor for driving the shaft in a first rotational direction; and a generator coupled to the shaft for producing electrical power when the shaft rotates in a second rotational direction opposite to the first rotational direction. The piston is vertically displaceable in a first vertical direction during a charging mode following operation of the motor, and is vertically displaceable in a second vertical direction opposite to the first vertical direction during a power generating mode after being hydrostatically driven to produce electrical power in conjunction with the generator.

18 Claims, 13 Drawing Sheets

(51) Int. Cl.
*F03B 17/02* (2006.01)
*H02J 15/00* (2006.01)

(52) U.S. Cl.
CPC ......... *H02J 15/003* (2013.01); *F05B 2240/40* (2013.01); *F05B 2260/4031* (2013.01); *F05B 2260/42* (2013.01); *F05B 2270/20* (2013.01); *Y02E 10/20* (2013.01); *Y02E 10/22* (2013.01); *Y02E 60/17* (2013.01); *Y02P 90/50* (2015.11)

(58) Field of Classification Search
USPC ................................ 60/495–507; 290/42, 53
See application file for complete search history.

(56) References Cited

U.S. PATENT DOCUMENTS

| | | | | |
|---|---|---|---|---|
| 6,831,373 B1* | 12/2004 | Beaston | ................ | F03B 17/025 290/42 |
| 2005/0146141 A1* | 7/2005 | Basteck | .................. | F16H 47/08 290/44 |
| 2012/0019004 A1* | 1/2012 | Ekern | ..................... | F03B 13/06 290/53 |
| 2012/0112472 A1 | 5/2012 | Murray et al. | | |

OTHER PUBLICATIONS

Written Opinion of the International Searching Authority regarding PCT/IL2015/050485, 9 pages, dated Mar. 14, 2016.

\* cited by examiner

STORED ENERGY SYSTEM

FIELD OF THE INVENTION

The present invention relates to the field of sustainable energy systems. More particularly, the invention relates to a stored energy system which is generally water based.

BACKGROUND OF THE INVENTION

Many pumped storage systems, often referred to as hydropower plants, are known in the prior art. In these plants, water is stored in an upper reservoir, and is released gravitationally during periods of high electricity demand to a lower reservoir whereat a turbine is deployed to generate power. During low-cost off-peak hours when there is less demand for electricity, the water is pumped back to the upper reservoir from the lower reservoir.

In order for these pumped storage systems to be economically viable, however, large scale hydropower plants on the order of 300 MW need to be erected. Such power levels are able to be achieved only when the differential height along which the stored water has to be delivered gravitationally is at least 100 meters, and generally at least 500 m, requiring high capital costs to build retaining walls for the reservoirs and pumping systems, as well as significant operating costs for pumping the delivered water back to the upper reservoir that reduce the profitability of the pumped storage system.

Another drawback associated with hydropower plants is the high rate of water evaporation from both the upper and lower reservoirs. Also, location-specific hydropower plants can be erected only at very specific locations characterized by a suitable topographical landscape which are not necessarily in the vicinity of power lines and therefore may not be beneficial to the utility company.

It is an object of the present invention to provide a water based stored energy system that is economically viable even when the height differential along which the water is delivered is significantly less than that of prior art systems.

It is an additional object of the present invention to provide a water based stored energy system that is economically viable even when it has a relatively low power capacity.

It is an additional object of the present invention to provide a water based stored energy system that is independent of a specific topographical layout.

Other objects and advantages of the invention will become apparent as the description proceeds.

SUMMARY OF THE INVENTION

The present invention provides a hydrostatically based energy conversion unit, comprising: a vertically oriented cylinder; a piston sealingly engaged with and vertically displaceable within said cylinder; a horizontal shaft rotatably mounted to a surface located above said cylinder and mechanically connected to said piston; a motor for driving said shaft in a first rotational direction; and a generator coupled to said shaft for producing electrical power when said shaft rotates in a second rotational direction opposite to said first rotational direction, wherein said piston is vertically displaceable in a first vertical direction during a charging mode following operation of said motor, and is vertically displaceable in a second vertical direction opposite to said first vertical direction during a power generating mode after being hydrostatically driven to produce electrical power in conjunction with said generator.

The energy conversion unit may also further comprise one or more of the following components:
a) a single vertically oriented feed pipe adjacent to and in fluid communication with the cylinder, into which a volume of liquid is introducible;
b) a reservoir located above the feed pipe, within which the liquid is collectable and with which the feed pipe is in fluid communication;
c) a winch drum mounted on the shaft, about which is wound a cable that is connected to the piston;
d) a cylinder cluster configured with a plurality of the cylinders and with the single feed pipe, wherein each of the plurality of cylinders is in fluid communication with the feed pipe and the piston is sealingly engaged with a corresponding cylinder of the plurality of cylinders;
e) a corresponding transfer conduit protruding upwardly from a bottom plate adapted to seal a bottom of the feed pipe and each of the plurality of cylinders, by which each of the plurality of cylinders is in fluid communication with the feed pipe;
f) a frequency controller for controlling an operating frequency of the generator such that a ratio of said operating frequency to a power line frequency will produce a constant power transfer rate; and
g) a braking member for stopping rotation of the shaft, wherein the piston is displaceable within the cylinder in the second vertical direction to a predetermined position by an introduced volume of the liquid, wherein operation of the motor causes the shaft to rotate in the first rotational direction and the piston to be displaced in the first vertical direction to a distance separated from said predetermined position until engagement of said braking member maintains said piston at said distance separated from said predetermined position, wherein the piston is subjected to a pressure differential at said distance separated from said predetermined position, so that disengagement of said braking member induces rotation of said shaft in the second rotational direction and generation of electrical power, in response to hydrostatically driven displacement of the piston within the cylinder towards the second vertical direction.

The present invention is also directed to a buoyancy based stored energy system, comprising a reservoir into which a volume of water is introducible, a generator for producing electricity, a horizontal-axis shaft mechanically coupled to said generator, a float module in force transmitting relation with said shaft and having a buoyant body that is submergible within said introduced volume of water, and a securing device for releasably maintaining said buoyant body at a lowered position, wherein said buoyant body is upwardly and buoyantly displaceable following release of said securing device, whereby to cause said shaft to rotate and said generator to produce electricity.

In one aspect, the float module is in force transmitting relation with the shaft by means of a mechanism for converting linear float displacement to rotary motion.

In one aspect, a plurality of the float modules is disposed at different regions within the reservoir and are in force transmitting relation with a common shaft. The plurality of float modules may be divided into groups such that the float modules of a given group are in force transmitting relation with a common secondary shaft and that each of said secondary shafts is in force transmitting relation with a primary shaft that is mechanically coupled to the generator.

In one aspect, the buoyant body securing device of each of the plurality of float modules is sequentially releasable from the corresponding fixed member, to ensure that electricity will be continuously producible.

In one aspect, the volume of water is gravitationally introducible from a free flowing river into the reservoir.

In one aspect, the system further comprises upper and lower reservoirs; a first conduit extending from the isolation device of said upper reservoir to said lower reservoir; a second conduit extending from said lower reservoir to said upper reservoir; and a pump operatively connected to said second conduit for pumping the volume of water to said upper reservoir upon completion of a power extraction operation at said lower reservoir, wherein each of the upper and lower reservoirs comprises the plurality of float modules and a corresponding generator and common shaft.

DETAILED DESCRIPTION OF PREFERRED EMBODIMENTS

The present invention is a stored energy system that exploits the force applied by a volume of water or any other suitable liquid onto an element that is submergible therewithin. Although the following description describes the use of water as the source of energy, it will be appreciated that the invention is also applicable to the use of other types of liquids as well.

In a first main embodiment, the buoyancy force applied by gravitationally delivered water is exploited, as opposed to prior art systems that exploit the potential energy of the gravitationally delivered water. A secured float, after being loaded by gravitationally delivered water, is released to generate power.

Figure 1:
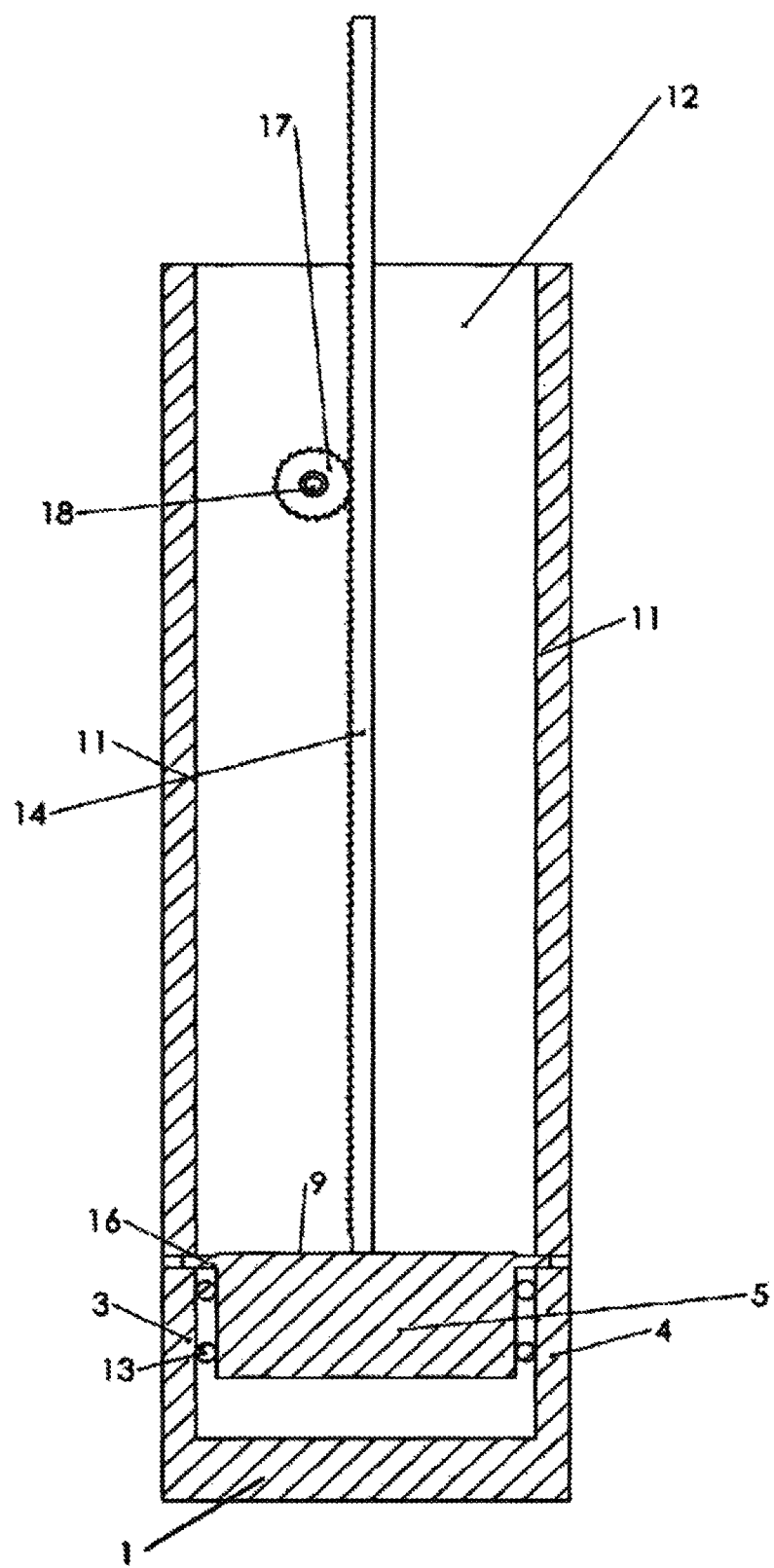
FIG. 1 is a front view of a float module used in conjunction with a stored energy system, according to one embodiment of the present invention.

FIG. 1 illustrates a float module 10 used in conjunction with a stored energy system, according to one embodiment of the present invention. Float module comprises a float 5, which may be any type well known to those skilled in the art, such as one that has a constant density, and positioned within an open reservoir 12 defined by an underlying concrete foundation 1 and a plurality of walls for retaining a body of water within the defined enclosure. A plurality of spaced uprights, such as uprights 3 and 4, vertically extend from, and are integrated with, foundation 1. Reservoir 12 is shown to be rectilinear, but any other configuration is also within the scope of the invention. Float 5 is engaged with two opposed tracks 11, each of which is fixed to a corresponding upright by suitable slidable engagement means 13, such as roller bearings, to ensure reliable linear vertical displacement.

A releasable securing device 16 is attached to the top 9 of float 5, or to any other convenient portion thereof. Securing device 16 is attachable to a fixed member provided at a corresponding upright when float 5 is located near the bottom of reservoir 12. More than one fixed member may be provided, each of which located at a different height, in order to control the amount of power that may be produced. Securing device 16 may be a manually attachable device such as a slidable rod insertable within a hole formed in a side wall, or alternatively may be electrically actuated by a remote command, and may even be automatically activated when a predetermined lower position, e.g. a lowermost position, is detected such as by means of a limit switch.

A ratchet wheel 17, or any other one-way mechanism, is fixed to a shaft 18 that extends between the two uprights 3 and 4, and is mechanically coupled to a generator. Engaged with ratchet wheel 17 is vertically extending rack 14, or any other toothed engagement element, that is connected to the top 9 of float 5.

After the downwardly disposed float 5 is loaded with water, securing device 16 is released. Float 5 is consequently subjected to a buoyancy force by the water in which it is submerged, causing the float to rise. As float 5 rises within reservoir 12, the resulting vertical motion of rack 14 causes ratchet wheel 17 with which it is engaged to rotate and to generate electricity. The water within reservoir 12 is then pumped, or otherwise drained, to another water source, preferably located at a reservoir above reservoir 12, in order to perform another cycle of stored energy power generation.

The buoyancy of float 5 is a function of its shape, thickness, density and the difference in water pressure at its bottom and top surfaces. Float 5 rises for a duration that is dependent upon the height of the enclosed body of water. The rate of rise of float 5 and consequently of rack 14 connected thereto directly influences the rotational speed of ratchet wheel 17 and the surprisingly high amount of power that may be generated from float module 10.

Figure 2:
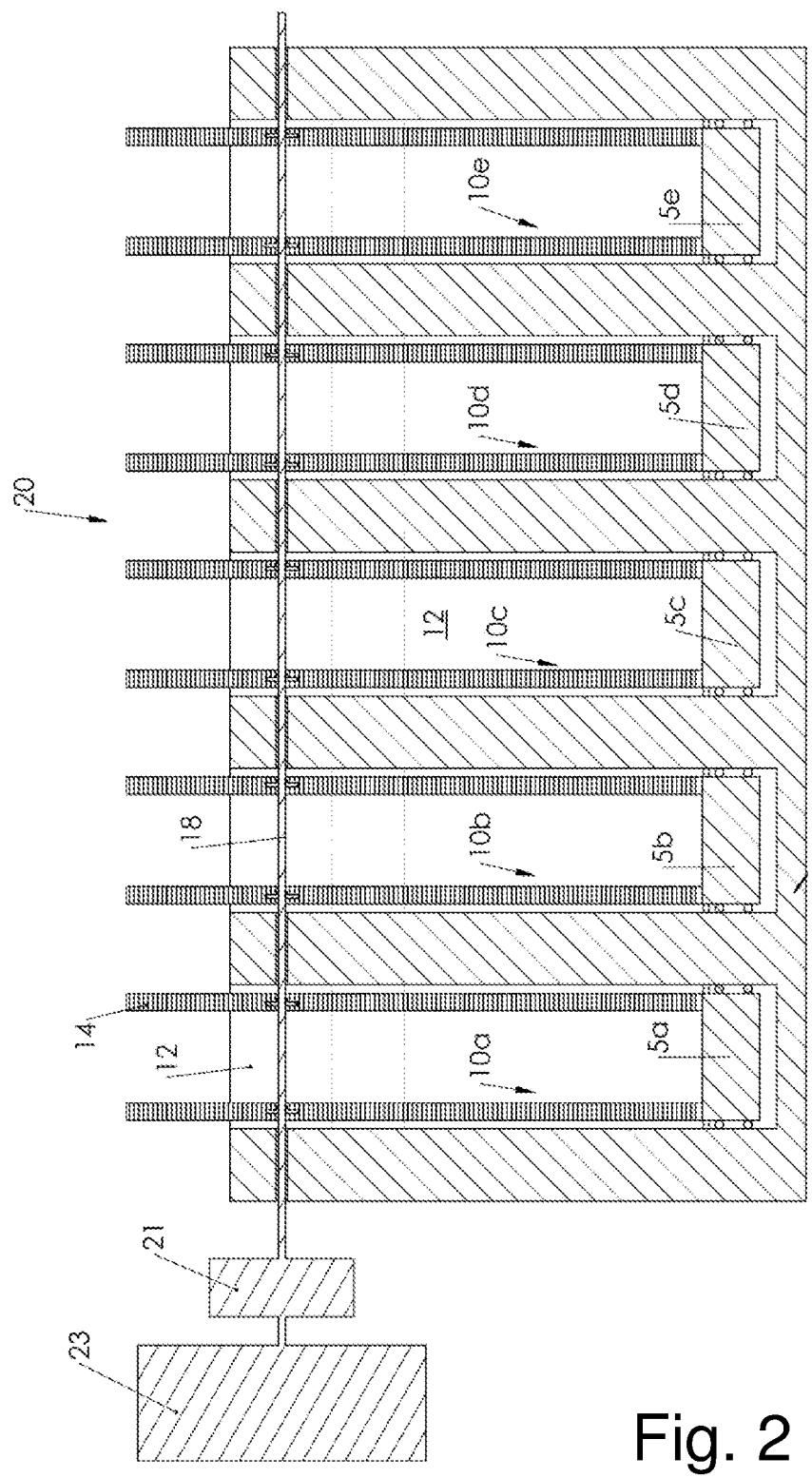
FIG. 2 is a side view of a stored energy system that comprises a plurality of the float modules of FIG. 1.

FIG. 2 illustrates a stored energy system 20 that comprises a plurality of float modules 10a-e, each of which comprising a float that is adapted to be selectively displaced upwardly within a body of water at a corresponding region of reservoir 12, to an exemplary position indicated by dashed lines, under the influence of the buoyancy force, as explained above. Each of the floats 5a-e is slidably engageable with two corresponding opposed sets of uprights. A single shaft 18 extends horizontally throughout the length of reservoir 12, and carries a plurality of ratchet wheels, each of which being engaged with a corresponding rack 14 that extends upwardly from a float and adapted to convert the linear buoyancy force into rotary motion. Gearbox 21 interfaces between shaft 18 and generator 23 that rotate at different speeds.

Figure 3:
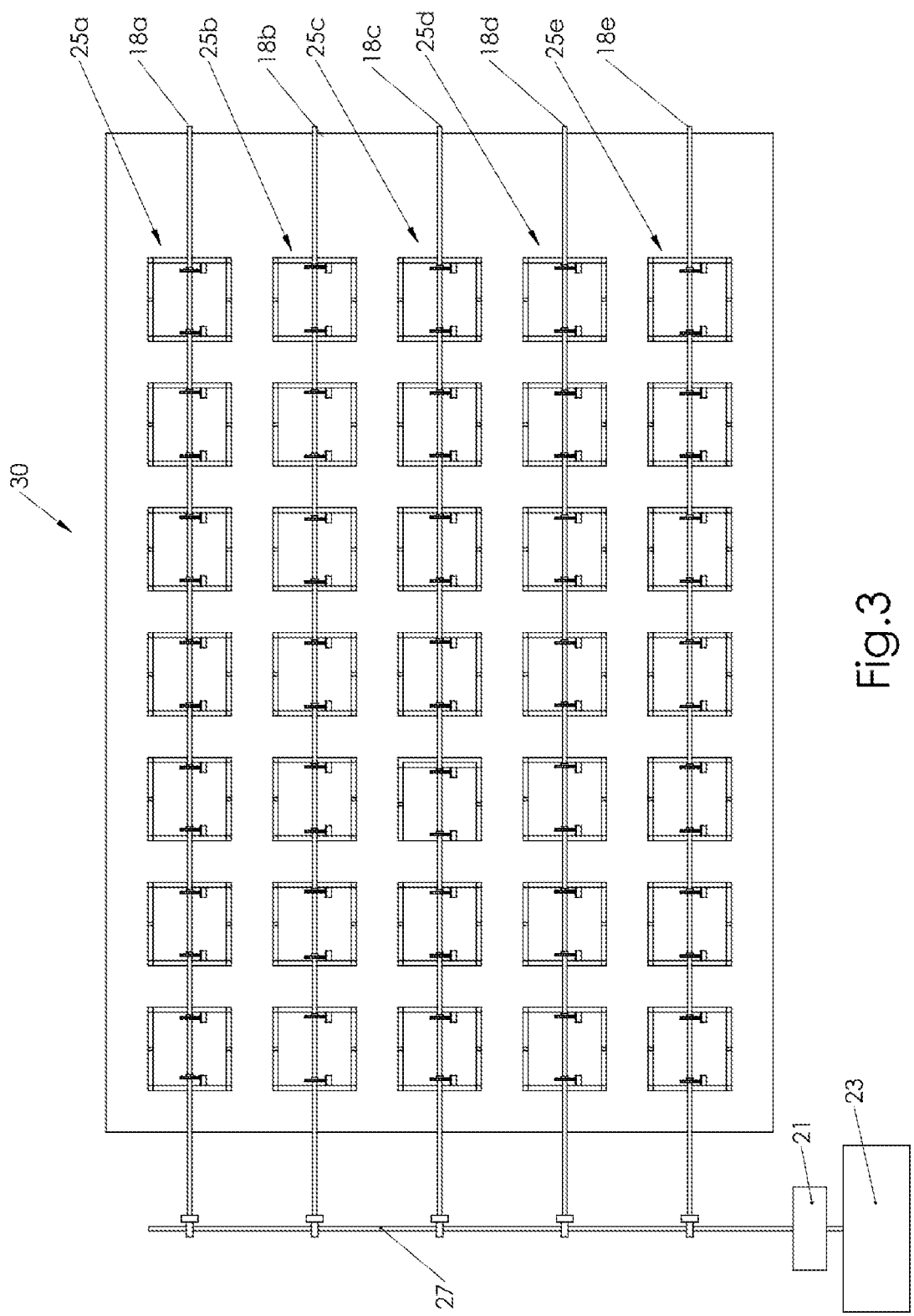
FIG. 3 is a plan view of a stored energy system, according to another embodiment of the invention.

The system 30 illustrated in FIG. 3 is arranged in an array of thirty-five float modules divided into five groups 25*a-e*, each of which being in force transmitting relation with one of the secondary shafts 18*a-e*. Any other arrangement of the float modules of course is within the scope of the invention. Each of the secondary shafts 18*a-e* in turn is in force transmitting relation, such as by a gear, with primary shaft 27 extending to gearbox 21 interfacing with generator 23. Each float module may also be connected using two common shafts close to the edge, rather than using a single central shaft.

Figure 4:
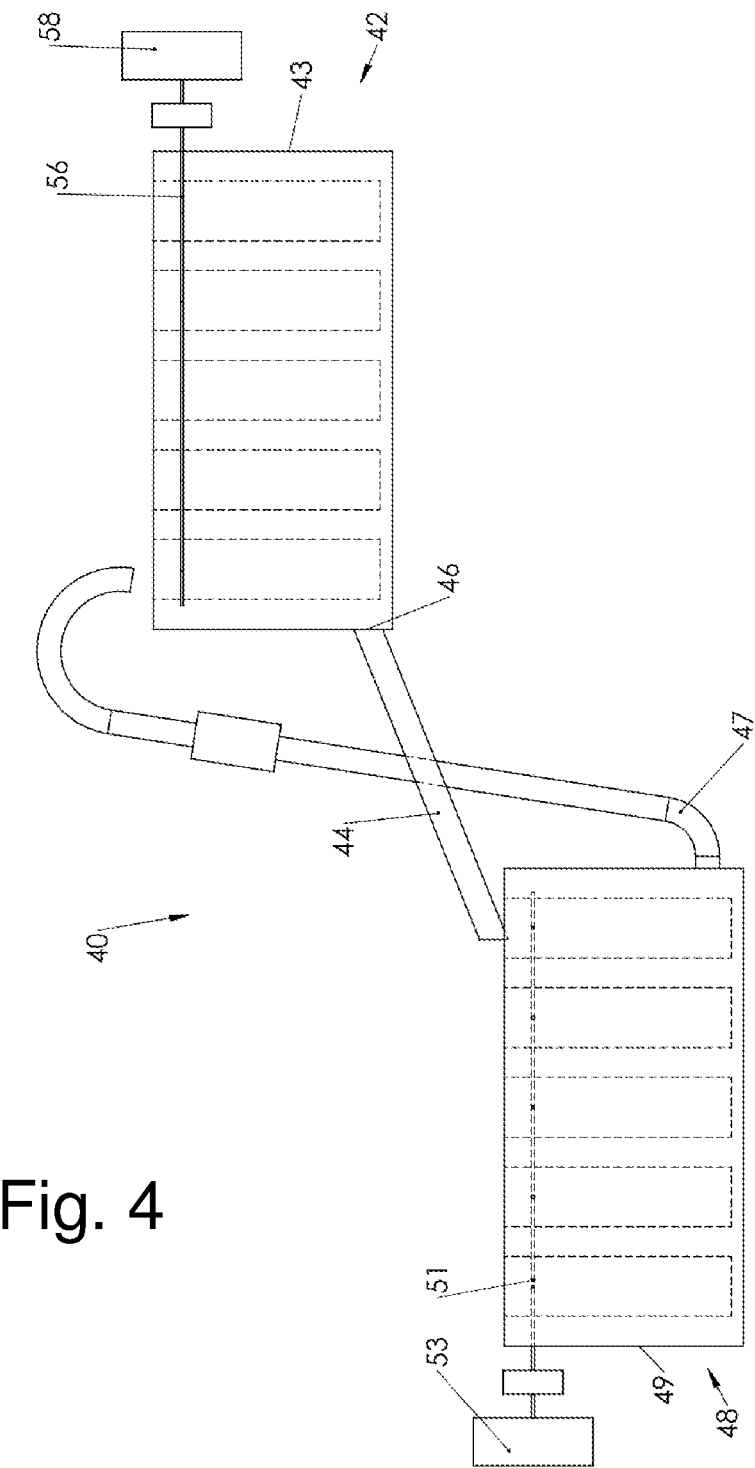
FIG. 4 is a side view of a stored energy system, according to another embodiment of the invention.

In FIG. 4, system 40 comprises an upper array 42 of float modules enclosed by an upper reservoir 43, and a lower array 48 of float modules enclosed by a lower reservoir 49. Each of upper array 42 and lower array 48 may be embodied by the system 20 of FIG. 2 or system 30 of FIG. 3 with a plurality of individually operable float modules that are all in force transmitting relation with a single shaft that is mechanically coupled to a generator. A conduit 44 such as a pipe extends downwardly from upper reservoir 43 to lower reservoir 49, for gravitationally delivering therethrough the accumulated water. A valve 46, or any other selective occluding means, is operatively connected to conduit 44, to prevent water from being drained from upper reservoir 43 when upper array 42 is being employed to generate power. An additional conduit 47 extends upwardly from lower reservoir 49 to upper reservoir 43, for pumping water therethrough after array 48 were used to generate power.

If desired, upper reservoir 43 and lower reservoir 49 may be covered to provide a self-contained closed system that minimizes or eliminates water evaporation.

In operation, a single body of water is used alternately to generate power with array 42 and then with array 48. After the float modules of lower array 48 are secured to a lowered position, valve 46 is opened during the early hours of the day, or at any other desired period of high electricity demand, to deliver the body of water to lower reservoir 49.

Each float 5 of array 48 is sequentially released, to ensure that electricity will be continuously produced by generator 53 during high-peak hours. That is, the securing device of a second float may be released from its corresponding fixed member after, e.g. immediately after, a first float has been upwardly displaced under the influence of buoyancy and has converted the buoyancy-induced motion to electrical power by means of the rack, ratchet wheel, shaft and generator arrangement described above. Alternatively, the second float may be released before the first float has reached its uppermost position. If an increased amount of power is desired to be produced, two or more floats may be released simultaneously, thereby increasing the rotational speed of shaft 51.

The floats may be manually released according to a desired sequence. Alternatively, the floats may be automatically released according to a predetermined sequence stored in the memory of a controller. The controller is preferably housed remotely from reservoir, and communicates wirelessly with an actuator embedded within a corresponding float in a waterproof manner that is adapted to release the securing device from the fixed member.

After all floats of lower array 48 have been upwardly displaced and all float modules of upper array 42 are secured to a lowered position, the pump is activated during off-peak hours to minimize pumping costs, causing substantially all of the water body to be delivered via conduit 47 to upper reservoir 43. The floats of upper array 42, while being loaded by the water body, are sequentially released in the same manner described with respect to lower array 48, to produce power by shaft 56 and generator 58. Power may be produced from upper array 42 during high-peak hours, or alternatively during off-peak hours.

As system 40 exploits the buoyancy of the floats and not the potential energy of the delivered water, the height differential between the upper and lower reservoirs may advantageously be minimized to a value significantly less than 100 meters, to reduce capital and operating costs.

Figure 5:
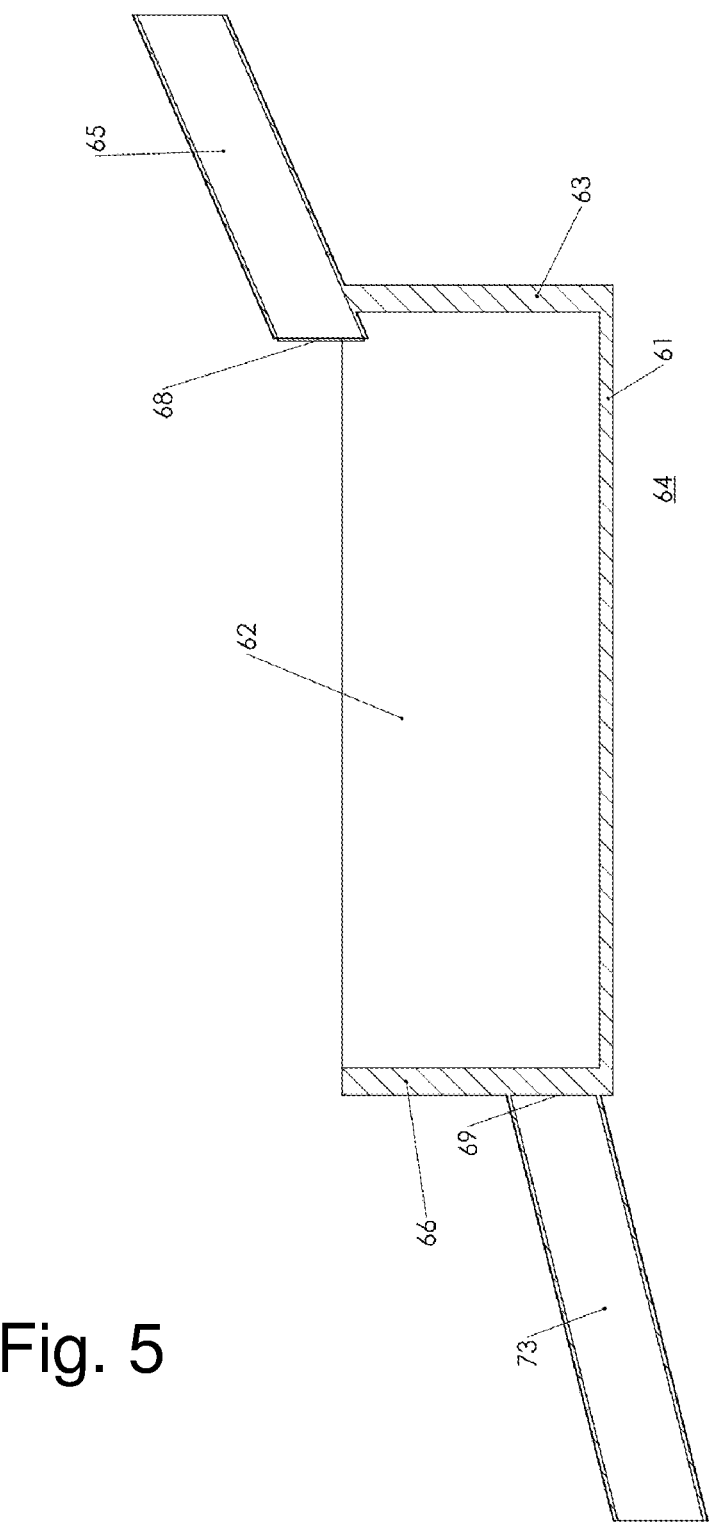
FIG. 5 is a side view of a reservoir for receiving a volume of water gravitationally delivered from a free flowing river.

FIG. 5 illustrates another embodiment of the invention wherein each reservoir is deployed along the natural terrain of a river channel. The system is therefore able to generate power from water-based stored energy without having to pump water from the lower reservoir to the upper reservoir, thus being a completely renewable energy system.

Reservoir 62 is excavated within the soil 64 adjacent to a free flowing river 65 such that the reservoir is able to be filled by the river water. The exemplary illustrated river has a downhill grade of 20%. A plurality of uprights equipped with a corresponding track are constructed, and extend vertically from foundation 61. One or more independently displaceable flow modules as described above are provided and their corresponding float is slidably engageable with the relevant tracks.

To enable selective ingress and egress of water, reservoir 62 has an inlet stop gate 68 operatively connected to one side wall 63 and an outlet stop gate 69 operatively connected to another side wall 66. The opening closed by outlet gate 69 is preferably formed at the bottom of side wall 66, to maximize water discharge, so that more water may be subsequently introduced in order to maximize power extraction. Each of vertically displaceable gates 68 and 69 is opened for a sufficiently short time to enable the passage of water therethrough, and may be manually operated, such as being chain pulled, or may be electrically or hydraulically operated.

Water is introduced to reservoir 62 via inlet gate 68 when the float modules are in a lowered position. After power is extracted from the float modules, the water is discharged from outlet gate 69 to canal 72 by which the discharged water is directed to another downhill segment of river 65, in anticipation of another power extraction cycle whereby the float modules are lowered and secured, water is introduced, and then the securing devices are released.

Figure 6:
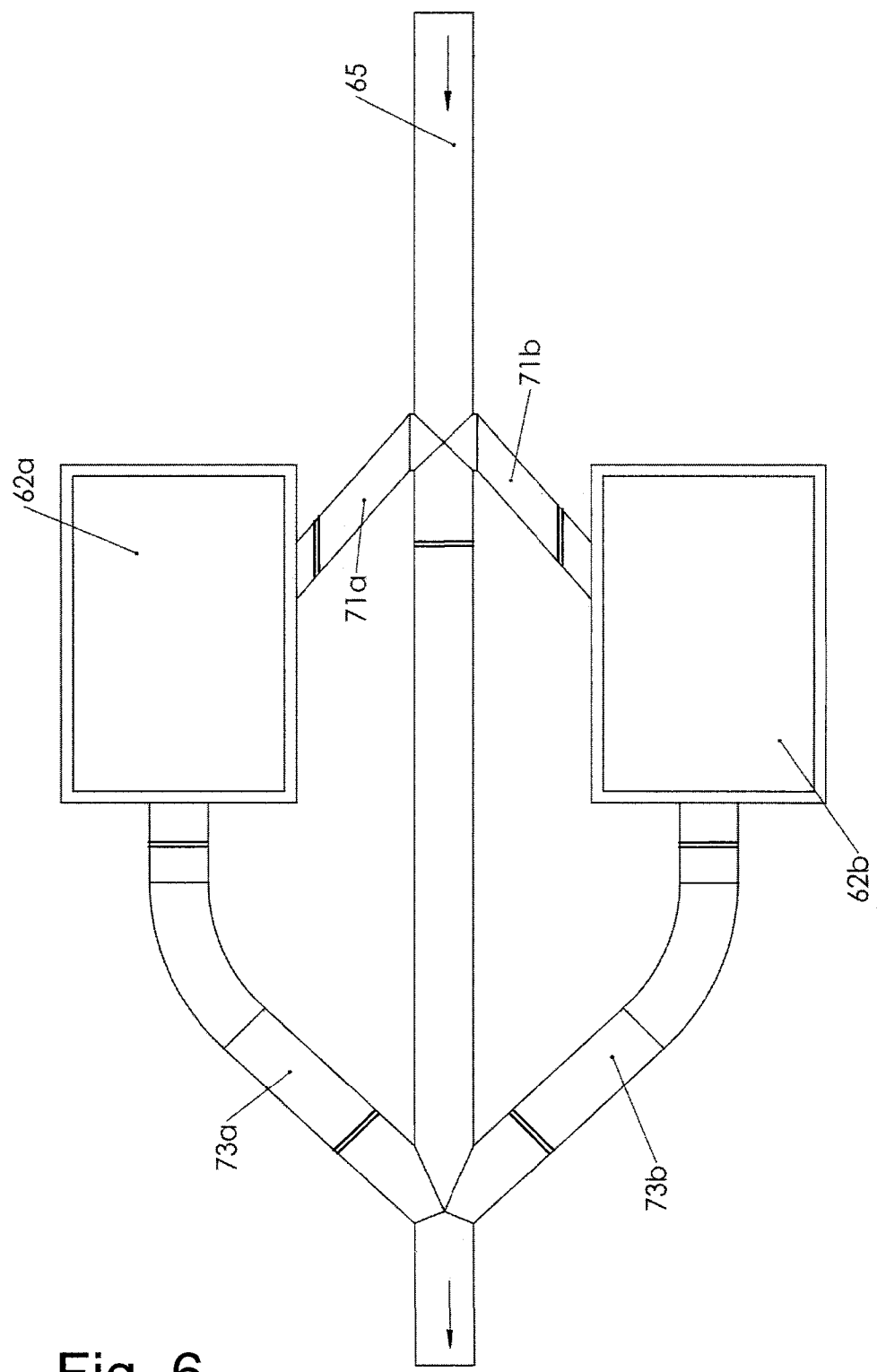
FIG. 6 is a plan view of two reservoirs for receiving a volume of water gravitationally delivered from a free flowing river.

As shown in FIG. 6, two reservoirs 62*a* and 62*b*, or any other desired number, may be deployed along river 65. Water flow control is made possible by divert canals 71*a* and 71*b* that extend from river channel 65 to the inlet gate of reservoirs 62*a* and 62*b*, respectively, and by return canals 73*a* and 73*b* that extend from reservoirs 62*a* and 62*b*, respectively, to river channel 65.

Many different water flow scenarios are envisioned. For example, when reservoirs 62*a* and 62*b* are located at substantially the same elevation, but at opposite sides of river channel 65, the water flow into each may be synchronized to ensure that the flow along river channel 65 will not be depleted at any given moment. Alternatively, when reservoirs 62*a* and 62*b* are located at different elevations, water may be simultaneously diverted to each, but at a sufficiently low flowrate for ensuring that the flow along river channel 65 will not be depleted at any given moment. The operation of the outlet gates may also be synchronized.

Regardless of the selected water flow scenario, each of the float modules within a given reservoir may be released according to a desired sequence in order to generate power.

According to another embodiment, in case when the reservoirs 12 with the float modules 10 of the present invention are deployed along a river having relatively low throughput, an accessory reservoir may be built nearby a group of several reservoirs 12. In this case, the accessory reservoir will be connected to each of the reservoirs 12 in the group via a conduit with controlled flow. It is possible to fill the accessory reservoir during nighttime (when the demand for electricity from the float modules 10 is low) by diverting some of the flow from the river channel to the accessory reservoir. During daytime (when the demand for electricity from the float modules 10 is high), the missing amount of water will be transferred via the conduit from the accessory reservoir to each the reservoirs 12. This will form an ongoing cycle of refilling the accessory reservoir during nighttime and using the water accumulated therein on demand, during daytime.

According to another embodiment, the float modules 10 of the present invention may be added to existing reservoirs which use conventional pumped storage systems in order to increase their efficiency, without requiring high capital costs to build the reservoirs. Each float module may be connected with 4 construction poles with tracks, so as to ensure reliable linear vertical displacement.

In order to keep continuity of electric power generation, the reservoirs 12 may be filled even partially (using the water from the river channel) during nighttime (when the electric power is cheap due to low demand), such that each reservoir will contribute its relative power generation portion during daytime according to the amount of water that has been accumulated therein during nighttime.

In a second main embodiment, the hydrostatic force to which a piston is subjected is exploited to generate electricity. A piston is downwardly displaceable in a charging mode upon activation of a motorized device to counteract the hydrostatic pressure, and is upwardly displaceable in a power generating mode, in response to the applied hydrostatic pressure. The hydrostatic pressure is dependent upon the distance between the piston and the water level in a reservoir located thereabove.

Figure 7:
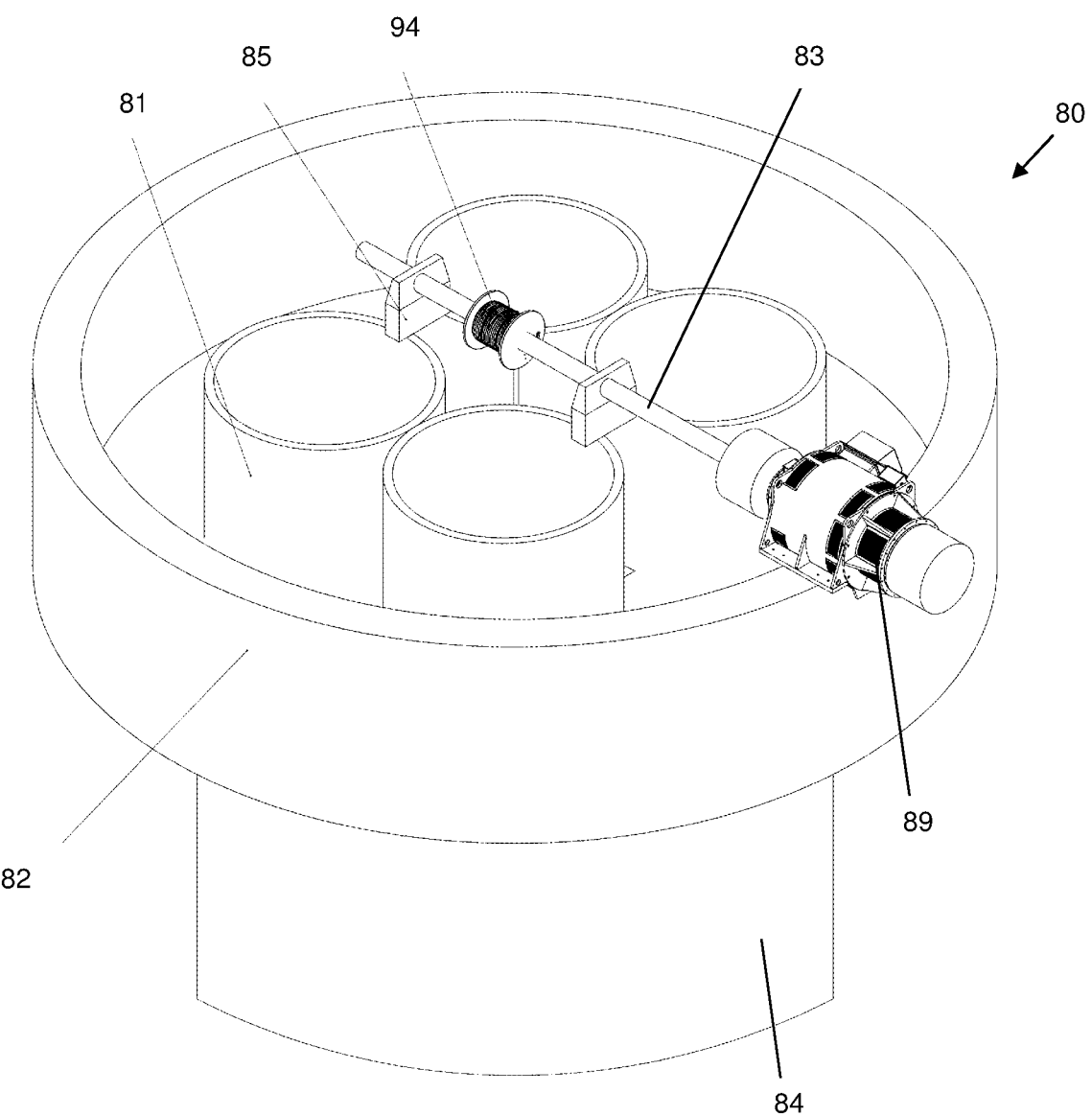
FIG. 7 is a perspective view from above of a portion of a hydrostatically driven energy conversion unit, according to one embodiment of the invention.
Figure 8:
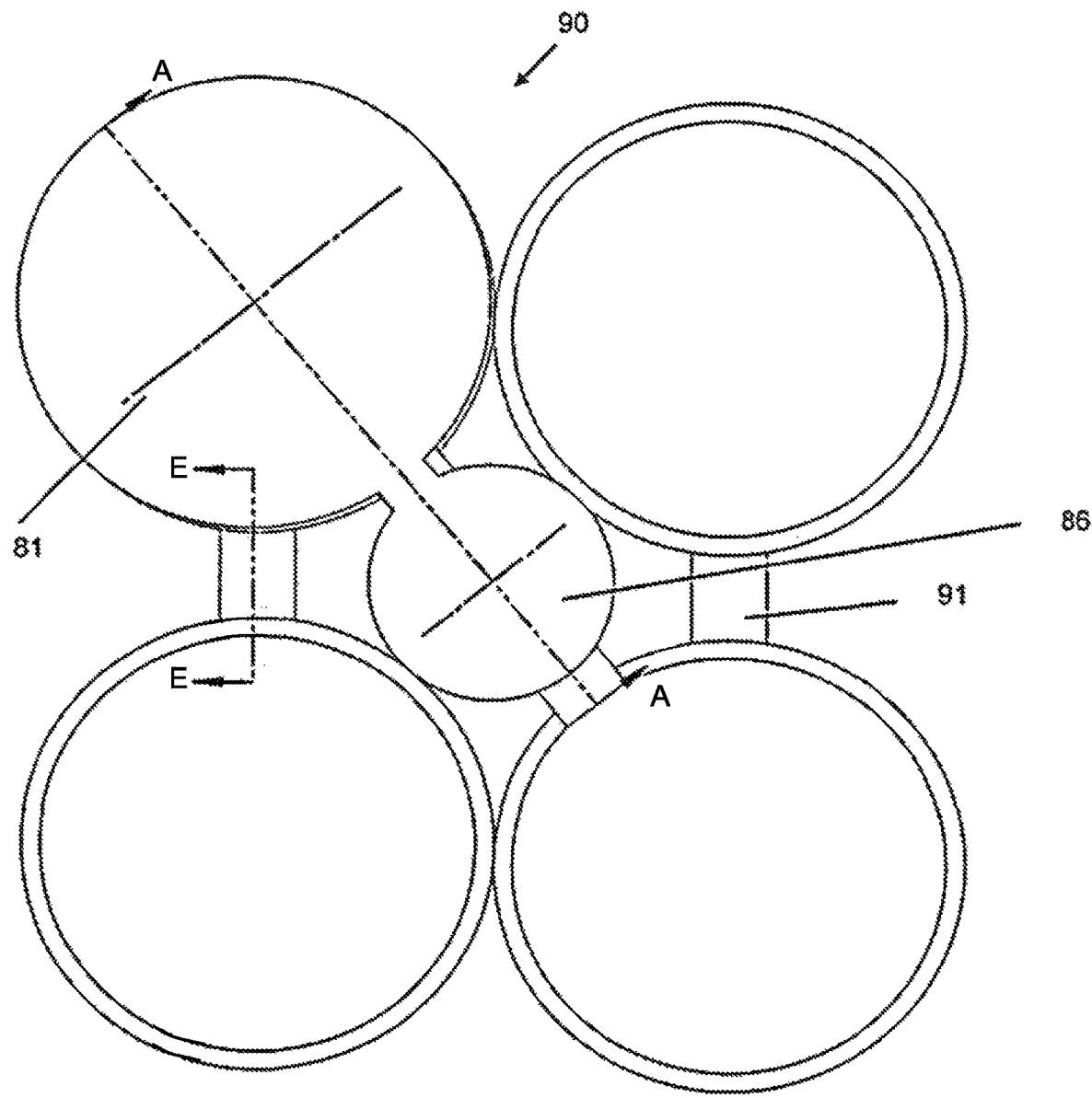
FIG. 8 is a plan view of an exemplary cluster of cylinders and feed pipe used in conjunction with the energy conversion unit of FIG. 7.

As shown in FIGS. 7 and 8, stored energy system 80 is embodied by a compact, cost effective and self-retained hydrostatically driven energy conversion unit.

Energy conversion unit 80 comprises a reservoir 82 in which overflowing water is collectable, one or more vertically oriented cylinders 81 positioned within reservoir 82, e.g. four as illustrated, within each of which a corresponding piston is vertically displaceable, a single vertically oriented feed pipe 86 adjacent to each of cylinders 81, a partially illustrated casing 84 surrounding the cylinders 81 and feed pipe 86 for providing structural strength, a horizontal shaft 83 rotatably mounted by bearing mounts 85 fixedly attached to the upper surface of two adjacent cylinders 81, a winch drum 94 mounted on shaft 83 about which is wound a plurality of cables each of which extends through feed pipe 86 and is connected to a corresponding piston, and a motor-generator 89 mounted at one end of shaft 83. Cylinders 81, reservoir 82, casing 84, and feed pipe 86 are all preferably metallic, such as stainless steel. The cables are preferably also made of a non-corrosive material. Fluid communication is provided between the bottom of feed pipe 86 and cylinders 81.

An exemplary cluster 90 of cylinders 81 and feed pipe 86 is shown in FIG. 8. Centrally positioned feed pipe 86 is surrounded by the four cylinders 81 and is welded thereto at a corresponding tangential surface, such that the upper edge of feed pipe 86 is located below the upper edge of each cylinder 81 and that the longitudinal axes of cylinders 81 and feed pipe 86 are mutually parallel. To enable water flow from the water reservoir to feed pipe 86, a spacer 91 is welded to each pair of cylinders 81 to define a minimal spacing therebetween. Each axial end of a spacer 91 may be concave, with the same radius of curvature as the cylinder 81 to which it is welded. A plurality of spacers 91 that are vertically spaced throughout the length of a pair of cylinders may be welded thereto for increased structural strength.

Figure 9:
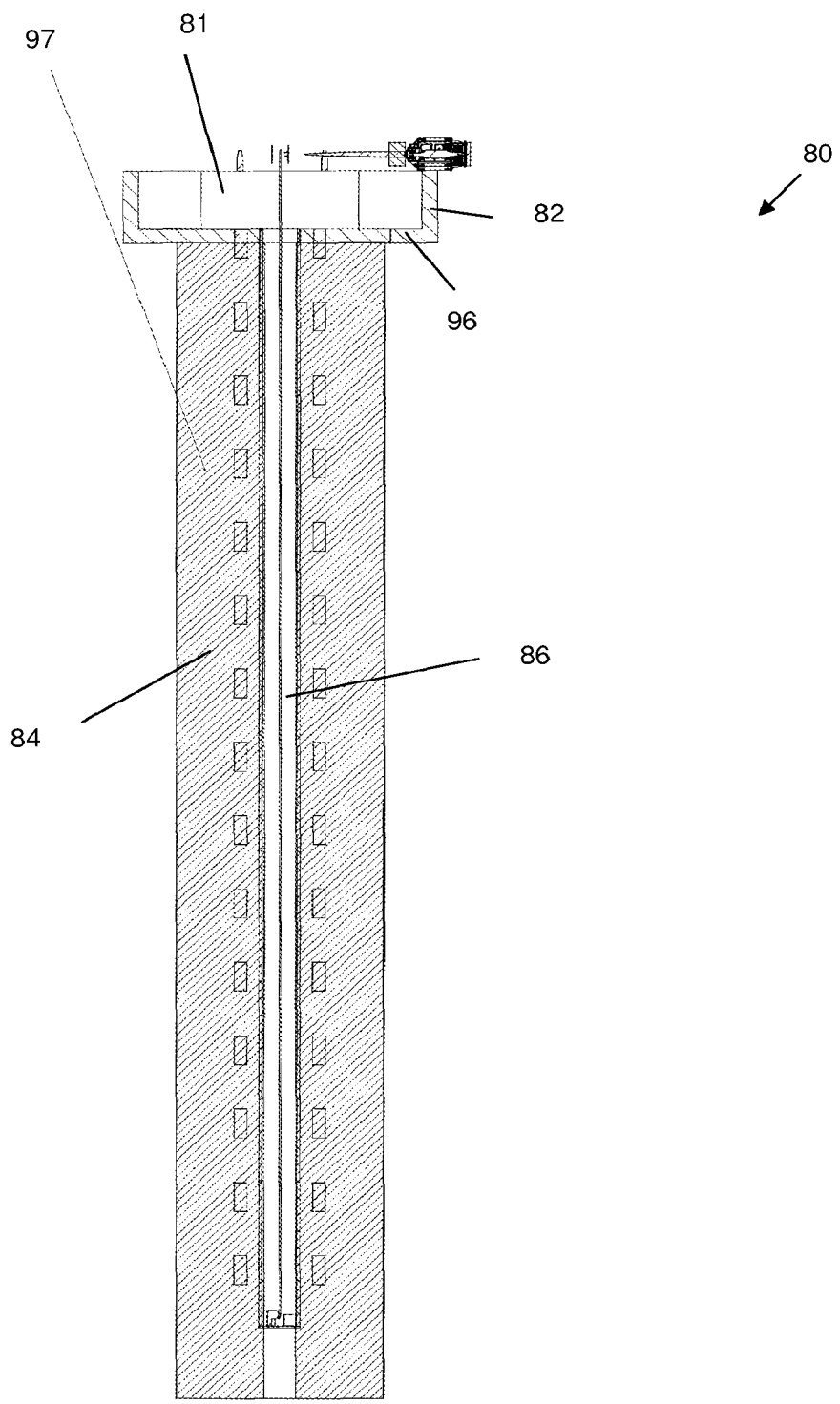
FIG. 9 is a vertical section of the entire depth of the energy conversion unit of FIG. 7.

A vertical section of energy conversion unit 80 is illustrated in FIG. 9. Tubular casing 84, which may be above ground or underground, is of a smaller diameter than, and located below, annular reservoir 82. Bottom surface 96 of reservoir 82 is formed with a central aperture through which feed pipe 86 having a depth on the order of tens of meters is positioned, such that the latter extends downwardly from bottom surface 96. Each of the cylinders 81 protrudes through an additional corresponding aperture formed in bottom surface 96, such that the upper edge of the cylinders 81 is located above bottom surface 96 and above the upper edge of feed pipe 86. The water level within reservoir 82 is thus below the upper edge of the cylinders 81, thereby preventing water to flow directly from reservoir 82 to cylinders 81. The volume of reservoir 82 is preferably at least equal to the total volume of all cylinders 81 that are used in energy conversion unit 80. Concrete 97 or any other suitable filling material is used to integrate the cylinders and feed pipe with casing 84.

If the energy conversion unit is deployed above ground, an external casing may not be needed, while the cylinder walls may be of added thickness to provide sufficient structural strength, for example when supporting the reservoir.

Figure 14:
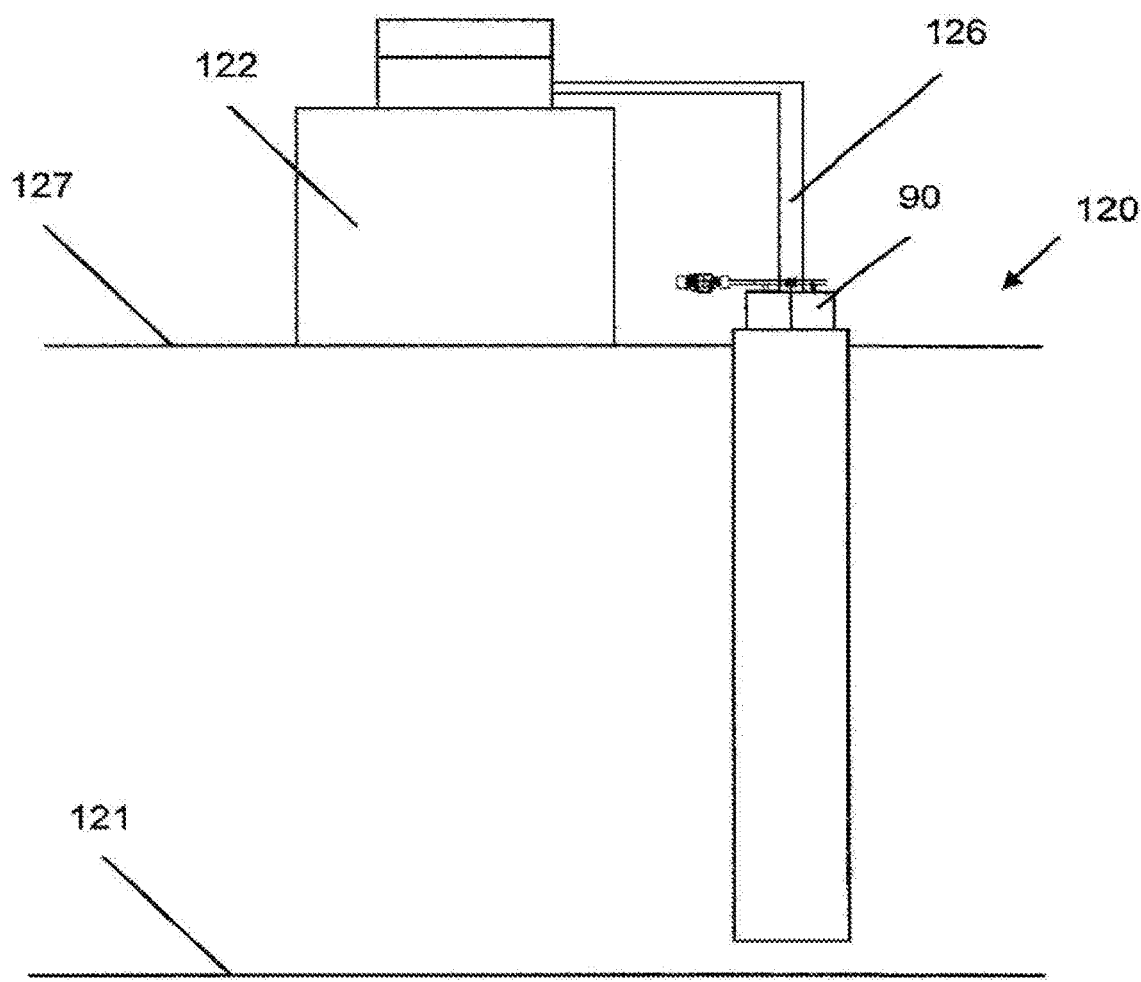
FIG. 14 is a side view of an energy conversion unit, according to another embodiment of the invention.

An energy conversion unit 120 deployed above ground surface 121 may benefit from the use of an existing reservoir 122 previously positioned on top of a desired structure 127, as shown in FIG. 14. Reservoir 122 may be positioned above and to the side of cylinder cluster 90, and an additional conduit 126 may extend from reservoir 122 to the feed pipe.

Figure 10:
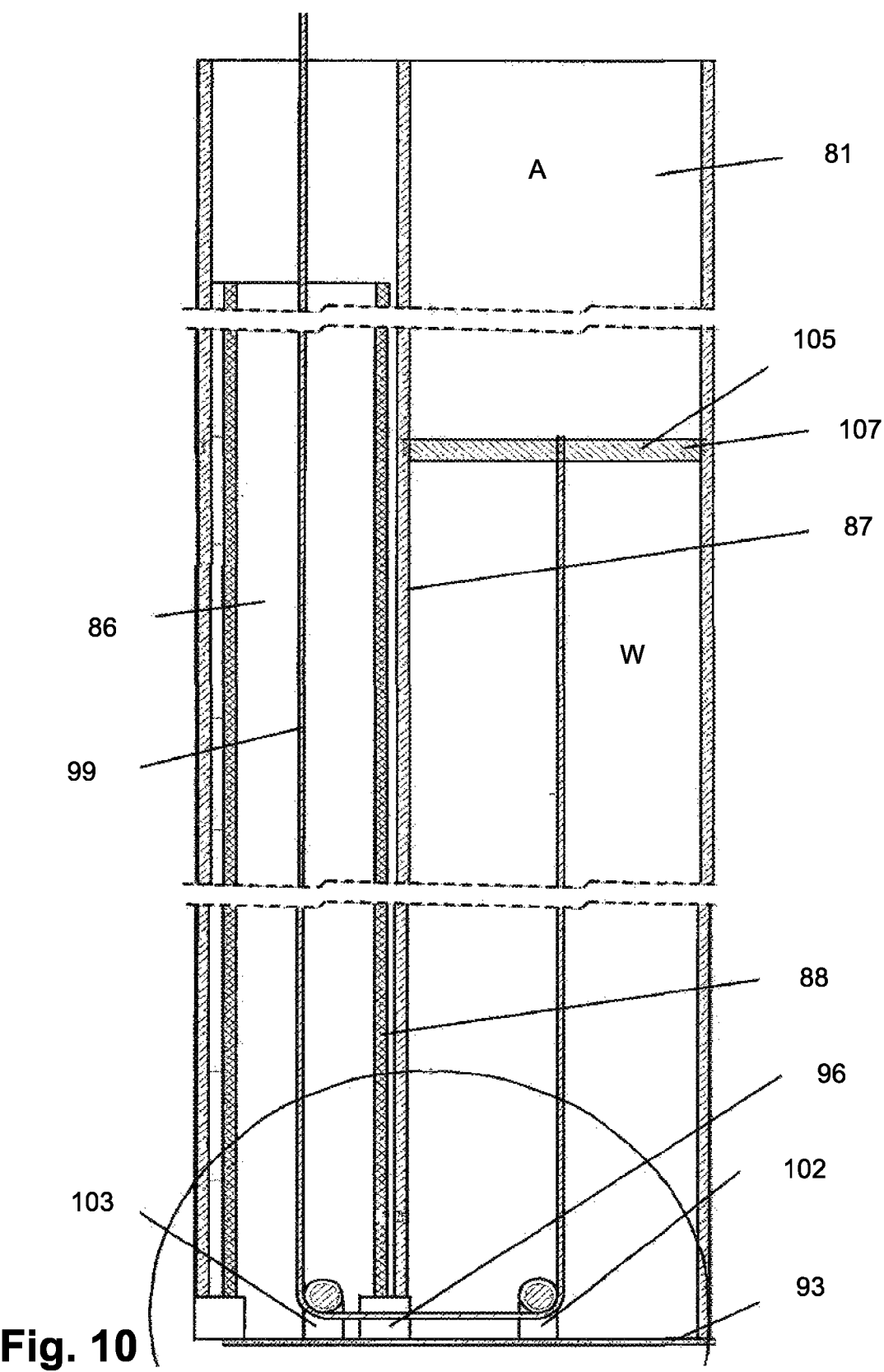
FIG. 10 is a fragmented vertical section of an installed cylinder and feed pipe cluster.

A fragmented vertical section of an installed cylinder 81 and feed pipe 86 is illustrated in FIG. 10. The bottom of each cylinder 81 and feed pipe 86 is occluded by a sealed bottom plate 93, to prevent passage of water below the casing. Attached to, and protruding upwardly from, bottom plate 93 is a short transfer conduit 96, e.g. of extruded squared pipe construction, for facilitating liquid communication between cylinder 81 and feed pipe 86 and also the extension therethrough of cable 99, which at one end is wound about winch drum 94 (FIG. 7) and at the other end is connected to piston 105. Transfer conduit 96 is also attached to the bottom of adjacent cylinder wall 87 and feed pipe wall 88, which are formed with a cutout or with an otherwise locally shortened configuration to accommodate connection to the transfer conduit.

A water column extending through feed pipe 86 to bottom plate 93 is accordingly developed. By virtue of transfer conduit 96, the high hydrostatic pressure at bottom plate 93 which is a function of the depth of the water column within feed pipe 86 is transmittable to region W and is appliable onto piston 106, particularly when the piston is located at a lowermost position. When piston 106 is being raised to an intermediate height within cylinder 81 by the water passing through transfer conduit 96, the hydrostatic pressure acting on piston 106 from below is gradually reduced as the height difference between the piston and the water level within the reservoir is decreased. The minimum hydrostatic pressure acting on piston 106 occurs when the piston its highest vertical position, which will be determined by activating a braking system (which will be described later on) to avoid further displacement of the piston 106 upwardly. At this (highest vertical) position, the corresponding force applied on the piston 106 will be minimal, as well.

One or more additional transfer conduits may be provided at an intermediate height of the feed pipe. A control valve may be operatively connected to each of the additional transfer conduits and be operational such that it is opened only during the power generating mode to quickly transfer water from the feed pipe to the cylinder below the instantaneous position of the piston, but remains occluded during the charging mode.

When cylinder 81 is lowered below the equilibrium position, the cylinder is subjected to a hydrostatic pressure derived pressure differential which urges piston 106 upwardly. The upward hydrostatic pressure derived force acting on piston 106 may be increased by increasing the diameter of cylinder 81.

Piston 105 may be a circular plate which is complementary in size to cylinder 81, and is made of a rigid material such as steel, wood, and plastic which will not become deformed when subjected to the hydrostatic pressure exerted by the water column. Piston 105 may be configured with a small circumferential groove to which is attached a sealing element 107, such as a rubber O-ring which is attached by epoxy or other adhesive material, or is mechanically coupled such as by frictional engagement. Sealing element 107 is in sealing engagement with cylinder wall 87, to prevent water flow between the variable water filled region W of cylinder 81 that underlies piston 105 and air-filled cylinder region A overlying piston 106 which is exposed to atmospheric pressure.

Alternatively, the piston may be a rigid float that has a sufficiently large hollow air-filled interior for generating a buoyancy force when submerged within the body of water located within region W. The structural strength of the floatable piston may be increased by a plurality of internal ribs. The floatable piston may be provided with a sealing element by which the cylinder wall is engaged. Cable 99 is fed through transfer conduit 96 by means of guide elements 102 and 103 protruding upwardly from bottom plate 93 and positioned within cylinder 81 and feed pipe 86, respectively. Guide elements 102 and 103 may be stationary or movable, e.g. pulleys. Cable 99 is slidable along guide elements 102 and 103 in both the charging and power generating modes.

Figure 11:
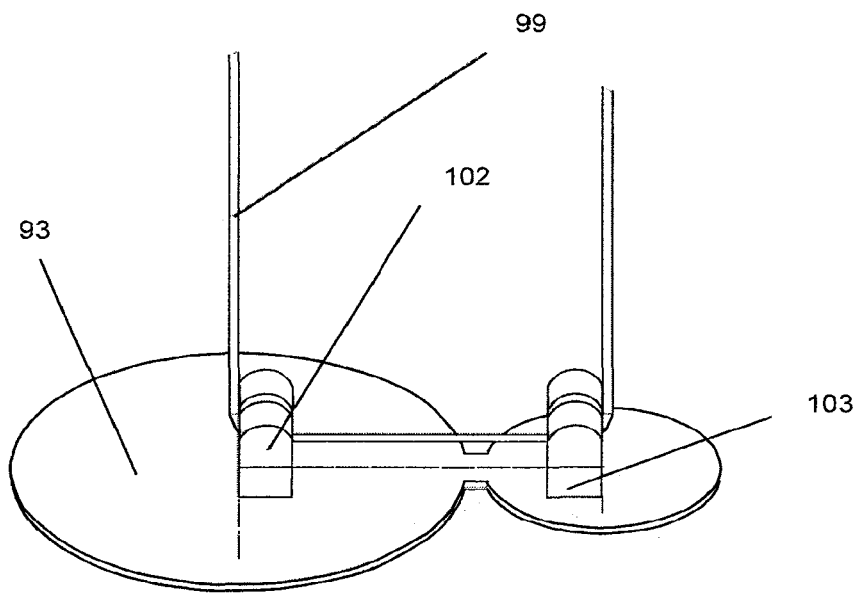
FIG. 11 is a perspective view from the top of a bottom plate connectable to the cluster of FIG. 10.
Figure 12:
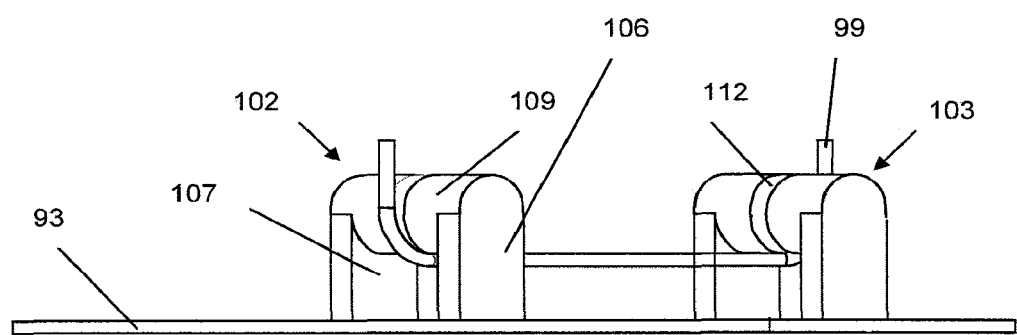
FIG. 12 is a perspective view from the side of a bottom plate connectable to the cluster of FIG. 10.

Exemplary guide elements 102 and 103 are illustrated in FIGS. 11 and 12. Unitary bottom plate 93 is shown to comprise two circular interconnected portions, one conforming to the size of the cylinder and the other conforming to the size of the feed pipe, but it will be appreciated that more bottom plate portions will be provided when a cluster includes a larger number of cylinders. Each of the guide elements has two parallel semi-elliptical legs 106 and 107 that protrude upwardly from bottom plate 93, and a tubular contact element 109 extending between legs 106 and 107 at an upper region thereof while providing a gap below contact element 109 and bottom plate 93 to enable displacement of cable 99. Contact element 109 is preferably made of a friction reducing material, and may be formed with a circumferential recess 112 to increase cable guidability. Contact element 109 may be stationary or be rotatable with respect to legs 106 and 107.

The assembly of the energy conversion unit will now be described when mounted underground. After cluster 90 (FIG. 8) is fabricated, usually not at the construction site, the bottom plate on which are mounted the transfer conduits and guide elements is welded to the bottom of the cluster in such a way that facilitates the flow and sealing of water while passing between the feed pipe and each cylinder, and vice versa. When a casing is employed, the bottom plate is also welded to the casing, and connecting elements may be welded between the cylinders and the casing.

A borehole is initially drilled within the selected soil formation. The cluster is then lowered into the borehole so as to be slightly spaced, e.g. by a gap of 10-20 cm from the face of the borehole, while ensuring that the longitudinal axis of the feed pipe coincides or is mutually parallel with the longitudinal axis of the borehole. The borehole diameter is substantially equal to, or slightly larger than, the cluster diameter, or of the casing diameter when a casing is employed, to ensure that the surrounding soil will provide sufficient reactive strength and to thereby avoid the need for additional structural reinforcement. Liquid concrete is then injected into all cavities between a cylinder and the borehole face, and between the feed pipe and a cylinder, or between a cylinder and the casing, so that the cluster will be suitably immobilized after the concrete becomes hardened. The reservoir bottom surface is then fitted about the cylinders and feed pipe, and is then welded to the upper edge of the feed pipe, and of the casing if a casing is employed, and to an upper portion of the cylinders. Finally, after the reservoir is welded to its bottom surface, the horizontal shaft together with the electrical system connected therewith is mounted on top of an upper edge of one or more cylinders. When more than one energy conversion unit is employed, the horizontal shaft may be common to a plurality of energy conversion units.

Figure 13:
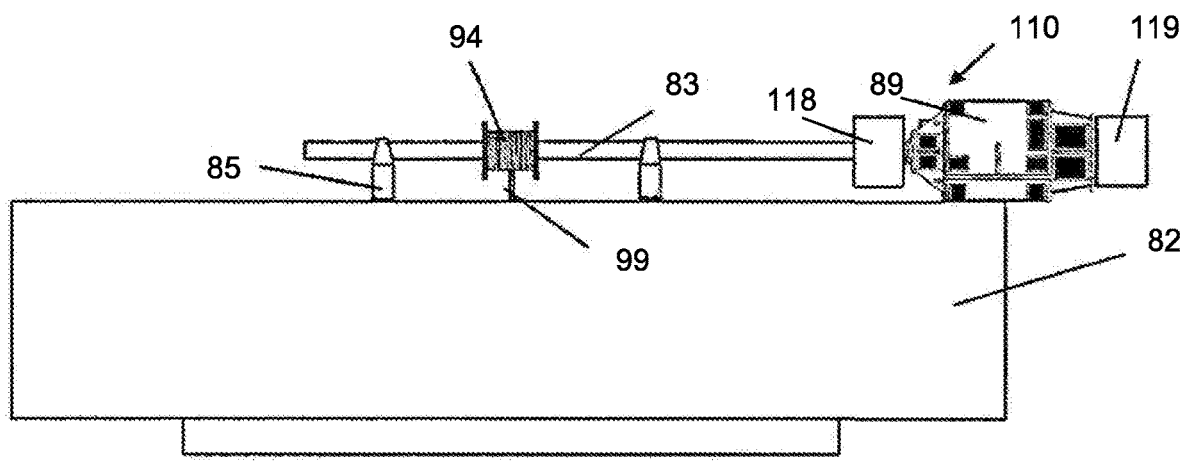
FIG. 13 is a side view of a portion of the energy conversion of FIG. 7, schematically illustrating the electrical system.

FIG. 13 schematically illustrates electrical system 110 of an energy conversion unit. As previously described, shaft 83 is rotatably mounted onto the upper edge of the cylinders by a plurality of bearings 85, e.g. a slide bearing or a roller bearing. Shaft 83 is driven in one rotational direction by the motor component of motor-generator 89, causing each cable 99 to be additionally wound about winch drum 94, which is mounted on shaft 83. The length of each cable within a corresponding cylinder is consequently caused to become shortened, and each piston is caused to be lowered below its equilibrium position.

Motor-generator 89 comprises an internal gear system which interfaces between the motor and the shaft. The gear system may have a fixed gear ratio for reducing the high rotational speed of the motor, which may run on AC power, to a slow rotational speed suitable for the shaft. If so desired, the motor and generator may be two separate components, each of which is mounted at a different portion of shaft 83.

Braking system 118, which is operatively connected to shaft 83, is actuated, whether manually or automatically, once the piston has been lowered to a desired lowered region within the cylinder. Upon actuation of braking system 118 at the end of the charging mode, as well known to those skilled in the art, the motor is deactivated. A first torque which is generated by braking system 118 and acting on shaft 83 is equal to, but in an opposite direction than, a second torque which is derived from the hydrostatic force, preventing rotation of the shaft. If braking system 118 were not actuated, rotation of shaft 83 in the reverse rotational direction, due to the second torque that urges winch drum 94 to unwind under the influence of the hydrostatic force exerted on a piston located below its equilibrium position, would normally result. The tension in cable 99 extending to winch drum 94 following actuation of braking system 118 is equal to, but directed in an opposite direction to, the hydrostatic force applied onto the piston.

When shaft 83 does rotate in the reverse rotational direction under the influence of the second torque following release of braking system 118, the power generating mode commences and the generator component of motor-generator 89 produces electricity, generally AC power for use in the grid.

The second torque which is a product of the hydrostatic force and the radius of winch drum 94, however, is variable since the winch drum unwinds while the piston is displaced vertically upwardly. Since the grid's operating frequency is fixed, unless using a frequency controller (converter), this operating frequency will be applied to the generator 23, which in turn will be forced to rotate at a corresponding (constant) rotational speed. Since the torque exerted on the shaft 83 as a result of the hydrostatic pressure will always be balanced by an opposite torque from the grid, shaft 83 which is rigidly connected to the winch drum, would rotate at a constant rotational speed. Therefore, the generator is synchronous with the grid and thus therefore its speed is determined by the grid frequency. However, in order to deliver constant power to the grid, the rotational speed of shaft 83 during the power generating mode should be varied, to compensate for the varying power applied to the piston 106 while moving upwardly (due to the change in the hydrostatic pressure). The rotational speed of shaft 83 may be controlled by applying a variable operating frequency to the generator 23, using a frequency controller (converter) 119, which converts the frequency of the power grid to another desired frequency. For example, it is possible to up-convert the 50 Hz power grid frequency to a higher frequency, which will force the generator 23 (and hence, the shaft 83, as well) to increase its rotational speed. Actually, frequency controller 119 compensates for the change in the second torque by controllably adjusting the operating frequency of the generator.

After a predetermined constant power transfer rate to the power grid has been selected, frequency controller 119 controls the operating frequency of the generator such that the ratio of the operating frequency to the power line frequency, a constant frequency of 50-60 Hz, will produce a constant power transfer rate. Due to the load imposed onto the generator by the grid, the shaft speed and rate of rise of the piston are generally restrained. The frequency controller 119 will maintain constant power generation by compensating for hydrostatic force degradation by increasing the shaft's rotational speed. When the piston 106 moves upwardly, the hydrostatic pressure, hence the force and torque exerted on the shaft 83, decreases. As a result, the rotational speed of the shaft 83 is increased accordingly, such that the product of the shaft rotational speed and the resultant hydrostatic force will be constant.

Frequency controller 119 is programmed to control the operating frequency of the generator (by varying the frequency conversion ratio) for any given vertical position of the piston at the end of the charging mode, in anticipation of a calculated change of second torque with respect to the configuration of the energy conversion unit and the volume of water retained thereby. The given vertical position of the piston may be determined by a pressure sensor fitted on the piston, or by counting the number of rotations made by the shaft, such as by means of an encoder, and converting the rotational displacement into a linear displacement of the piston.

The following describes the operation of the energy conversion unit, whether a multi-cylinder unit or a single cylinder unit. The charging mode commences when the motor is operated to slowly rotate the shaft in the first rotational direction, generally during low-cost, off-peak hours. As the shaft rotates in the first direction, each cable is wound about a winch drum. All cables may be wound about the same winch drum, for example such that a partition separates one cable from the other, or alternatively about corresponding winch drums. The winding of a cable, which is connected to a corresponding piston and extends through the feed pipe and the corresponding cylinder, draws the piston downwardly. The forceful downward displacement of the sealed piston caused by the motor overcomes the high weight of the water column and forces the entire water column upwardly. Pressurized water is discharged from the upper opening of the feed pipe and is received within the reservoir. The charging mode ends when the piston is drawn to the bottom of the cylinder to cause a volume of water equal to that previously retained in the cylinder to be discharged to the reservoir, or to an intermediate position below the equilibrium position, and the braking system is activated to stop rotation of the shaft.

The power generating mode commences when the braking system is deactivated, generally during a high-peak period. At the beginning of the power generating mode, the hydrostatic pressure acting on each piston is dependent upon the height difference between the water surface in the reservoir and the vertical position of the piston. Since each piston is subjected to a pressure differential, i.e. between the hydrostatic pressure from below and the atmospheric pressure from above, the pistons are urged upwardly towards the equilibrium position under the influence of the hydrostatic pressure, while the corresponding cable begins to unwind and the corresponding volume of the water filled region below each piston increases. As a result of the increasing volume of the water filled region below each piston, water in the reservoir is drained through the reservoir bottom surface into the feed pipe.

In response to the rising pistons, the shaft rotates in the second rotational direction and electrical power is produced by the generator. The level of power that may be ideally generated by the energy conversion unit is the hydrostatic force applied on the piston, multiplied by the upward velocity of the piston, until the piston once again reaches the equilibrium position. The actual velocity of the piston is set by the frequency controller since the hydrostatic force is counterbalanced by the load imposed by the grid. Each energy conversion unit may generate an energy level ranging from 50-500 kWh, depending on its size.\

Figure 15:
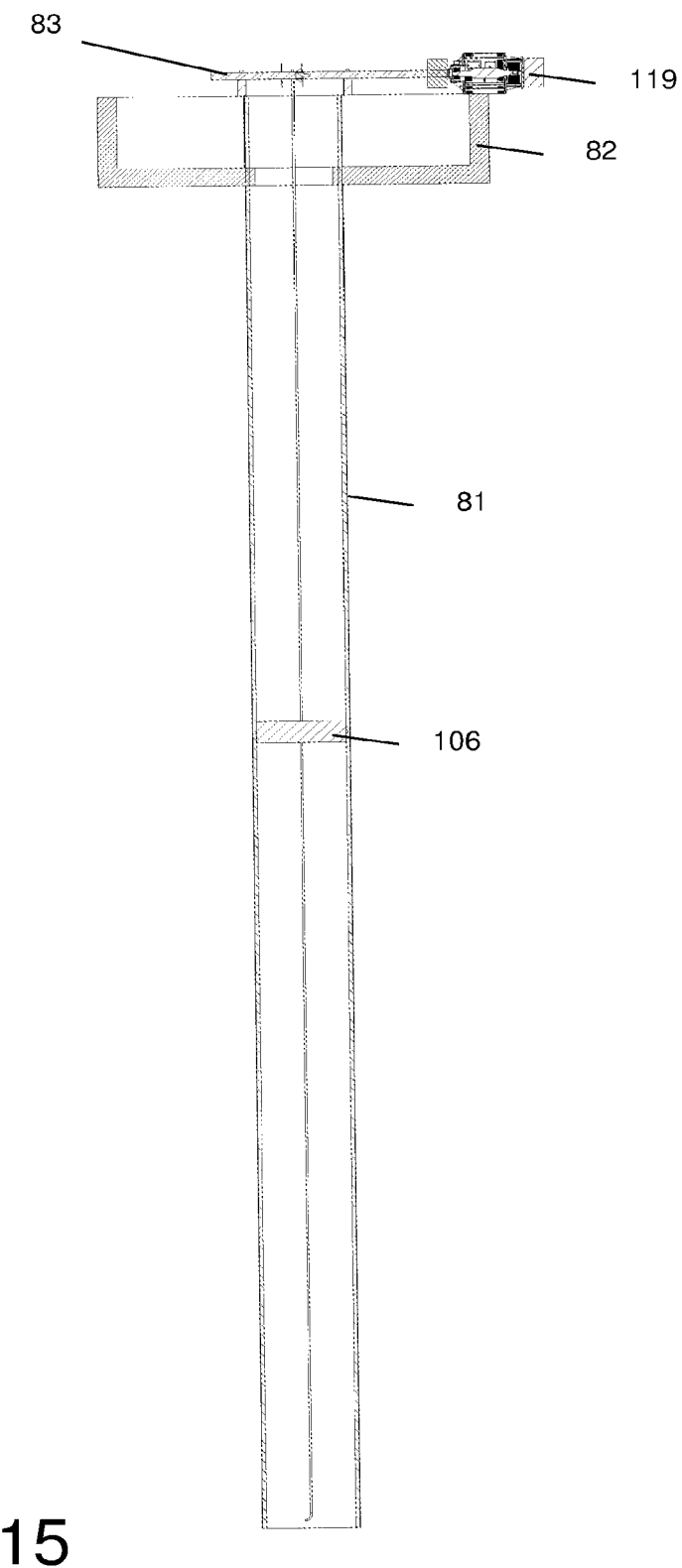
FIG. 15 is a side view of an energy conversion unit, according to a further embodiment of the invention.

FIG. 15 illustrates another embodiment, according to which the water reservoir 82 is located directly above the cylinder, such that no feed pipe needed. In this embodiment, water from the reservoir 82 is filling the top portion of the cylinder 81, above the piston 106. The piston 106 is in sealing condition with respect to the cylinder 81, thus assuring that the cylinder portion below the piston will always be empty (from water). According to this embodiment, during discharging mode (power generation), the piston moves downwardly as water from the water reservoir 82 is constantly filling the top portion of the cylinder, above the piston 106. In this mode, the hydrostatic pressure exerted on the piston increases, since the height difference between the piston level and the water reservoir levelincreases, as well. In order to maintain a constant amount of generated power, the frequency controller 119 will be set to decrease the rotational speed of the shaft 83. During charge mode, the piston 106 will be initially located at the bottom of the cylinder 81, such that the top portion of the cylinder above the piston is filled with water. When the motor is activated, it will force the piston 106 to move upwardly, hence pushing water from the cylinder portion above the piston into the water reservoir 82.

The cycle efficiency is very high, on the order of 95% or more, and may be maintained throughout the life of the energy conversion unit. As the energy conversion unit has very limited deterioration, the number of cycles that can be performed during the lifetime of the energy conversion unit is generally much greater than what can be achieved by prior art energy systems, such as standard battery technology.

The power generating mode may be carried out as a single event, or as more than one event, depending on the amount of energy stored in the energy conversion unit and the time of day that the power is generated. Each event commences when the brake is disengaged to enable vertical rise of the piston and ends when the brake is once again engaged.

Although the profitability of the energy conversion unit is maximized when the motor is operated during the nighttime, or any other low-cost, off-peak period, to charge the unit, and the power generating mode is carried out during a high-cost, high-peak period such as during the daytime, the energy conversion unit may be used for more than one charging/powering generating cycle during the course of a 24-hour period.

For example, the charging mode of a first cycle may take place during the nighttime and the power generated mode may be initiated in the early morning, such as 8 AM when there is significant power demand, yet conventional power plants are not yet fully operational. The charging mode of a second cycle may then be immediately carried out, so that the power generating mode will take place when the power demand is maximum, such as during the early afternoon.

The energy conversion unit can be configured in many ways. In one configuration, for example, the electrical system may be provided without a braking member, such that the power charging mode is carried out immediately after the charging mode has been completed. A cycle may be properly timed so that the transition between the charging mode and the power charging mode will coincide with the transition between low peak hours and high peak hours.

When a system comprises a plurality of energy conversion units, continuity of power generation during the course of the day may be envisioned as each unit is connected to a different region of the shaft, or to a different shaft, and therefore power may be generated at different times.

The system may be implemented in malls, office buildings, factories and multi-story buildings in which water reservoirs needed for the water sprinkler system or the fire extinguisher system are already installed. Alternatively, the reservoir of an energy conversion unit may be connected with a swimming pool, such as one positioned on the roof of the building.

Due the high reliability of the energy conversion unit, the need of a factory to maintain a dedicated generator as a power backup system can be obviated.

As an added safety measure, the motorized device needed during the charging mode may be powered by alternative energy resources such as wind and solar energy, thereby providing means for storage and power stabilization.

Given the ability to be powered by alternative energy resources, the energy conversion unit may be used at rural sites as a standalone power generation system which provides the entire power demand of a remote facility or village, i.e. no grid connection is needed.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A hydrostatically based energy conversion unit, comprising:
   a) a vertically oriented cylinder;
   b) a piston sealingly engaged with and vertically displaceable within said cylinder;
   c) a horizontal shaft rotatably mounted to a surface located above said cylinder and mechanically connected to said piston;
   d) a motor for driving said shaft in a first rotational direction;
   e) a generator coupled to said shaft for producing electrical power when said shaft rotates in a second rotational direction opposite to said first rotational direction;
   f) a single vertically oriented feed pipe adjacent to and in fluid communication with said cylinder, into which a volume of liquid is introducible; and
   g) a reservoir located above said feed pipe, within which the liquid is collectable and with which said feed pipe is in fluid communication,
   wherein said piston is vertically displaceable in a first vertical direction during a charging mode following operation of said motor, and is vertically displaceable in a second vertical direction opposite to said first vertical direction during a power generating mode after being hydrostatically driven to produce electrical power in conjunction with said generator,
   wherein pressurized liquid is dischargeable from said feed pipe while said piston is being downwardly displaced and said discharged liquid is receivable within said reservoir, such that the downwardly displaced piston is subjected to a pressure differential due to higher hydrostatic pressure within the volume of liquid and lower atmospheric pressure in a region of the cylinder above said piston.

2. A hydrostatically based energy conversion unit, comprising:
   a) a vertically oriented cylinder;
   b) a piston sealingly engaged with and vertically displaceable within said cylinder;
   c) a horizontal shaft rotatably mounted to a surface located above said cylinder and mechanically connected to said piston;
   d) a motor for driving said shaft in a first rotational direction;
   e) a generator coupled to said shaft for producing electrical power when said shaft rotates in a second rotational direction opposite to said first rotational direction; and
   f) a winch drum mounted on said shaft, about which is wound a cable that is connected to said piston.

3. The energy conversion unit according to claim 2, further comprising a reservoir within which a liquid dischargeable from the cylinder is collectable.

4. The energy conversion unit according to claim 1, further comprising:
   i) a cylinder cluster configured with a plurality of the cylinders and with the single feed pipe, wherein each of the plurality of cylinders is in fluid communication with the feed pipe and the piston is sealingly engaged with a corresponding cylinder of the plurality of cylinders; and ii) a winch drum mounted on the shaft, about which is wound a cable that is connected to the corresponding piston.

5. The energy conversion unit according to claim 4, wherein
   i) each of the cylinders protrudes through a corresponding aperture formed in a bottom surface of the reservoir, and an upper edge of each of the cylinders is located above an upper edge of the feed pipe; or
   ii) an upper edge of the feed pipe coincides with the bottom surface of the reservoir; or
   iii) the reservoir is separate from the cylinder cluster, and a conduit extends from the feed pipe to the reservoir; or
   iv) each of the plurality of cylinders is in fluid communication with the feed pipe by a corresponding transfer conduit protruding upwardly from a bottom plate adapted to seal a bottom of the feed pipe and each of the plurality of cylinders, wherein the cable connected to each of the pistons is fed through the corresponding transfer conduit by means of first and second guide elements protruding upwardly from the bottom plate, said first guide element being positioned within the feed pipe and said second guide element being positioned within a corresponding cylinder.

6. The energy conversion unit according to claim 1, wherein the reservoir is an existing reservoir selected from the group consisting of a swimming pool, a water tank of a sprinkler system, and a water tank of a fire extinguisher system.

7. The energy conversion unit according to claim 1, further comprising a braking member for stopping rotation of the shaft,
   wherein the piston is displaceable within the cylinder in the second vertical direction to a predetermined position by an introduced volume of the liquid,
   wherein operation of the motor causes the shaft to rotate in the first rotational direction and the piston to be displaced in the first vertical direction to a distance separated from said predetermined position until engagement of said braking member maintains said piston at said distance separated from said predetermined position,
   wherein the piston is subjected to a pressure differential at said distance separated from said predetermined position, so that disengagement of said braking member induces rotation of said shaft in the second rotational direction and generation of electrical power, in response to hydrostatically driven displacement of the piston within the cylinder towards the second vertical direction.

8. The energy conversion unit according to claim 7, wherein the braking member is also engageable with the shaft when the piston is located at the predetermined position.

9. The energy conversion unit according to claim 1, further comprising a frequency controller for controlling an operating frequency of the generator such that a ratio of said operating frequency to a power line frequency will produce a constant power transfer rate, wherein the frequency controller is operable to control the operating frequency of the generator for any given vertical position of the piston prior to the power generating mode or to maintain a product of a rotational speed of the shaft and an applied hydrostatic force at a substantially constant value.

10. A buoyancy based stored energy system, comprising:
    a) a reservoir into which a volume of water is introducible;
    b) a generator for generating electricity;
    c) a horizontal-axis shaft mechanically coupled to said generator;
    d) a float module in force transmitting relation with said shaft and having a buoyant body that is submergible within said introduced volume of water; and
    e) a securing device for releasably maintaining said buoyant body at a lowered position, wherein said securing device is adapted to releasably secure said buoyant body, when at said lowered position, to a fixed member of said reservoir; and e)f)a controller in which is stored a predetermined releasing sequence, said controller operable to transmit a command wirelessly to an actuator for releasing said securing device from said fixed member, wherein said actuator is embedded within said buoyant body in a waterproof manner,
    wherein said buoyant body is upwardly and buoyantly displaceable within said reservoir following release of said securing device from said fixed member, whereby to cause said shaft to rotate and said generator to produce electricity.

11. The system according to claim 10, wherein the float module is in force transmitting relation with the shaft by means of a mechanism for converting linear displacement to rotary motion which comprises a vertically extending engagement element that is connected to a top of the buoyant body, and a one-way mechanism that is fixed to the shaft and engaged with said engagement element.

12. The system according to claim 11, wherein the vertically extending engagement element is a rack and the one-way mechanism is a ratchet wheel.

13. The system according to claim 10, wherein
    i) the buoyant body is slidably engageable with a plurality of uprights extending upwardly from a foundation of the reservoir to ensure the linear displacement; or
    ii) the buoyant body is a piston sealingly engaged with and vertically displaceable within a vertically oriented cylinder to ensure the linear displacement; or
    iii) the buoyant body is a float having a constant density; or
    iv) a plurality of the float modules are disposed at different regions within the reservoir and are in force transmitting relation with a common shaft; or
    v) the plurality of float modules are divided into groups such that the float modules of a given group are in force transmitting relation with a common secondary shaft and that each of said secondary shafts is in force transmitting relation with a primary shaft that is mechanically coupled to the generator; or
    vi) the buoyant body securing device of each of the plurality of float modules is sequentially releasable from a corresponding fixed member, to ensure that electricity will be continuously producible; or
    vii) the securing device is manually releasable from the corresponding fixed member.

14. The system according to claim 10, wherein the volume of water is gravitationally introducible into the reservoir or the volume of water is gravitationally introducible from a free flowing river into the reservoir.

15. The system according to claim 10, further comprising an isolation device through which the introduced volume of water is selectively dischargeable from, or selectively introducible into, the reservoir.

16. The system according to claim 15, further comprising:
    a) upper and lower reservoirs;
    b) a first conduit extending from the isolation device of said upper reservoir to said lower reservoir;

c) a second conduit extending from said lower reservoir to said upper reservoir; and d) a pump operatively connected to said second conduit for pumping the volume of water to said upper reservoir upon completion of a power extraction operation at said lower reservoir, wherein each of the upper and lower reservoirs comprises a plurality of float modules and a corresponding generator and common shaft with which said plurality of float modules are in force transmitting relation.

17. The energy conversion unit according to claim 3, further comprising a single vertically oriented feed pipe adjacent to and in fluid communication with the cylinder, into which a volume of liquid is introducible, wherein pressurized liquid is dischargeable from said feed pipe while the piston is being downwardly displaced and said discharged liquid is receivable within the reservoir, such that the downwardly displaced piston is subjected to a pressure differential due to higher hydrostatic pressure within the volume of liquid and lower atmospheric pressure in a region of the cylinder above the piston.

18. The energy conversion unit according to claim 17, further comprising a cylinder cluster configured with a plurality of the cylinders and with the single feed pipe, wherein each of the plurality of cylinders is in fluid communication with the feed pipe and the piston is sealingly engaged with a corresponding cylinder of the plurality of cylinders, wherein each cable that is connected to the piston which is sealingly engaged with a corresponding cylinder is wound about the winch drum.

\* \* \* \* \*